(12) United States Patent
Morris et al.

(10) Patent No.: US 7,827,965 B2
(45) Date of Patent: Nov. 9, 2010

(54) TECHNIQUES FOR DELIVERING FUEL TO A PISTON AIRCRAFT ENGINE

(75) Inventors: James Paul Morris, Montoursville, PA (US); Charles Schneider, Watsontown, PA (US)

(73) Assignee: Lycoming Engines, a division of Avco Corporation, Williamsport, PA (US)

( * ) Notice: Subject to any disclaimer, the term of this patent is extended or adjusted under 35 U.S.C. 154(b) by 396 days.

(21) Appl. No.: 11/928,293

(22) Filed: Oct. 30, 2007

(65) Prior Publication Data

US 2009/0112440 A1  Apr. 30, 2009

(51) Int. Cl.
F02M 7/24 (2006.01)
F02M 51/00 (2006.01)

(52) U.S. Cl. .................. 123/480; 123/438; 123/494

(58) Field of Classification Search .............. 123/438, 123/494
See application file for complete search history.

(56) References Cited

U.S. PATENT DOCUMENTS

| 3,679,185 | A | * | 7/1972 | Nardi ..................... 261/36.2 |
| 3,884,195 | A | * | 5/1975 | Murtin et al. ............... 123/485 |
| 4,050,428 | A | * | 9/1977 | Masaki ..................... 123/438 |
| 4,216,673 | A | * | 8/1980 | November ..................... 73/861 |
| 4,264,961 | A | * | 4/1981 | Nishimura et al. ............ 702/47 |
| 4,452,207 | A | * | 6/1984 | Moore, Jr. ................ 123/676 |
| 4,549,517 | A | * | 10/1985 | Kamiyama ................. 123/478 |
| 4,562,744 | A | * | 1/1986 | Hall et al. ................. 73/861.02 |
| 4,637,261 | A | * | 1/1987 | Kraus et al. .............. 73/861.02 |
| 4,750,464 | A | * | 6/1988 | Staerzl ....................... 123/494 |
| 4,903,649 | A |   | 2/1990 | Staerzl |
| 5,714,683 | A |   | 2/1998 | Maloney |
| 6,279,519 | B1 |   | 8/2001 | Nagel et al. |
| 6,546,811 | B2 | * | 4/2003 | Fincke ..................... 73/861.63 |
| 7,162,991 | B2 |   | 1/2007 | White et al. |
| 7,234,423 | B2 |   | 6/2007 | Lindsay |
| 7,360,511 | B2 |   | 4/2008 | Lemke et al. |
| 2007/0192047 | A1 |   | 8/2007 | Foucault et al. |

OTHER PUBLICATIONS

Bermann Schafer, "Lehrbuch der Expermintalphysik Band 1, 10. Auflage", 1990, De Gruyter, Berlin, XP002517492, ISBN: 3-11-012391-6, pp. 341-350.

* cited by examiner

Primary Examiner—Stephen K Cronin
Assistant Examiner—Raza Najmuddin
(74) Attorney, Agent, or Firm—BainwoodHuang (57) ABSTRACT

A piston aircraft engine assembly includes a piston aircraft engine, a fuel source, and a control system adapted to deliver fuel from the fuel source to the piston aircraft engine. The control system includes a mass airflow sensing apparatus adapted provide a pressure signal, an electronic engine controller coupled to the mass airflow sensing apparatus, and a set of fuel injectors. The electronic engine controller is adapted to (i) receive the pressure signal from the mass airflow sensing apparatus and (ii) generate a set of fuel injector signals based on the pressure signal received from the mass airflow sensing apparatus. The set of fuel injectors is adapted to meter the fuel in response to the set of fuel injector signals generated by the electronic engine controller.

20 Claims, 5 Drawing Sheets

TECHNIQUES FOR DELIVERING FUEL TO A PISTON AIRCRAFT ENGINE

BACKGROUND

A conventional piston aircraft engine typically includes multiple cylinder assemblies which combust a mixture of fuel and air to drive pistons within the cylinder assemblies. The pistons turn a Crank shaft, which in turn, drives a load such as an airplane propeller or blades of a helicopter.

The delivery of fuel and air for the above-described conventional piston aircraft engine is typically in the context of a constant flow mechanical system. In particular, the cylinder assemblies receive the fuel and air mixture from a carburetor, which combines the fuel and air together. The amounts of fuel and air are determined by the position of throttle linkage which is controlled by the pilot in the aircraft's cockpit.

To change the speed of the engine, the pilot manually adjusts the position of the throttle linkage. Accordingly, the pilot is capable of metering the amount of air and fuel manually in order to control operation of the above-described conventional piston aircraft engine.

SUMMARY

Unfortunately, there are deficiencies to the above-described conventional piston aircraft engine, which receives the fuel and air mixture from a carburetor. For example, a constant flow mechanical system such as that described above is inappropriate for a fuel injected piston aircraft engine.

To accommodate the needs of a fuel injected piston aircraft engine, the mass of air entering the throttle of the engine needs to be known (e.g., to be input as data into various stoichiometric fuel metering equations). Along these lines, one might initially consider using a conventional automotive thin wire pressure sensor which measures the mass of airflow entering a car engine. Such an automotive thin wire pressure sensor measures small changes in resistance as the mass of air flowing past the automotive thin wire pressure sensor changes. Unfortunately, such an automotive thin wire pressure sensor may be too fragile for a safety critical piston aircraft engine.

In contrast to the above-described conventional fuel delivery approach which uses manually operated throttle linkage to control the fuel and air mixture to the piston aircraft engine, an improved technique involves utilization of a Venturi-based mass airflow sensing apparatus to deliver fuel to a piston aircraft engine. Such a mass airflow sensing apparatus is capable of dependably providing a pressure signal to an electronic engine controller, which controls operation of a set of fuel injectors. The electronic engine controller is then able to accurately determine the mass of the airflow to the piston aircraft engine and properly generate a set of fuel injector signals for controlling fuel delivery through the set of fuel injectors. Accordingly, reliable and precise fuel metering to each cylinder of the piston aircraft engine is obtainable.

One embodiment is directed to a piston aircraft engine assembly which includes a piston aircraft engine, a fuel source, and a control system adapted to deliver fuel from the fuel source to the piston aircraft engine. The control system includes a mass airflow sensing apparatus adapted to provide a pressure signal, an electronic engine controller coupled to the mass airflow sensing apparatus, and a set of fuel injectors. The electronic engine controller is adapted to (i) receive the pressure signal from the mass airflow sensing apparatus and (ii) generate a set of fuel injector signals based on the pressure signal received from the mass airflow sensing apparatus. The fuel injectors are used to meter the fuel in response to the set of fuel injector signals generated by the electronic engine controller.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 1 is a side view of a piston aircraft engine assembly, which utilizes a mass airflow sensing apparatus such as a Venturi meter device to deliver fuel to a piston aircraft engine.

FIG. 2 is a diagram illustrating particular sensing components of the piston aircraft engine assembly of FIG. 1.

FIG. 3 is a diagram illustrating a manifold which distributes air to each cylinder assembly of the piston aircraft engine assembly of FIG. 1.

FIG. 4 is a chart of pressure through a Venturi meter device of the piston aircraft engine assembly of FIG. 1 vs. air flow.

FIG. 5 is a flowchart of a procedure which is performed by the piston aircraft engine assembly of FIG. 1.

DETAILED DESCRIPTION

An improved technique involves utilization of a Venturi-style mass airflow sensing apparatus to deliver fuel to a piston aircraft engine. Such a mass airflow sensing apparatus is capable of dependably providing a pressure signal to an electronic engine controller which controls operation of a set of fuel injectors. The electronic engine controller is able to correctly determine the mass of the airflow based on the pressure signal, and suitably generate a set of fuel injector signals for controlling fuel delivery through the set of fuel injectors. Accordingly, reliable and precise fuel metering to each cylinder of the piston aircraft engine is obtainable.

Figure 1:
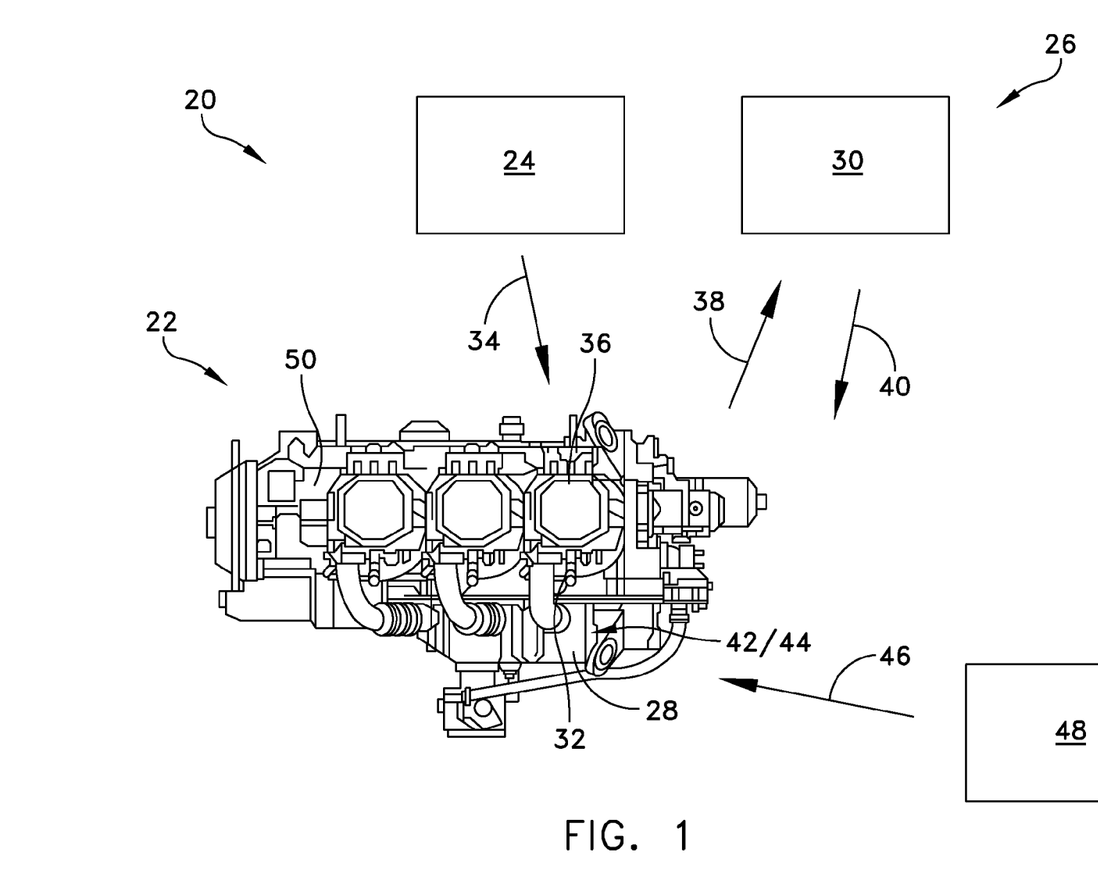

FIG. 1 shows a piston aircraft engine assembly 20, which utilizes mass airflow sensing to deliver fuel to cylinder assemblies of a piston aircraft engine. The piston aircraft engine assembly 20 includes a piston aircraft engine 22, a fuel source 24 (shown generally by the block 24 in FIG. 1) and a control system 26. The control system 26 includes a mass airflow sensing apparatus 28, an electronic engine controller 30 (shown generally by the block 30 in FIG. 1), and a set of fuel injectors 32.

During operation, the control system 26 delivers fuel 34 from the fuel source 24 (e.g., a fuel tank) to cylinder assemblies 36 of the piston aircraft engine 22. In particular, the mass airflow sensing apparatus 28 provides a pressure signal 38. The electronic engine controller 30, which is coupled to the mass airflow sensing apparatus 28 (e.g., via a cable harness), receives the pressure signal 38 and generates fuel injector signals 40 based on the pressure signal 38. The fuel injectors 32 then individually meter the fuel 34 in response to the fuel injector signals 40 for dependable and effective aircraft engine operation.

As will be explained in further detail shortly, the mass airflow sensing apparatus 28 includes a Venturi meter device 42 and a differential pressure sensor 44 (shown generally by the arrow 42/44 in FIG. 1) which handles air 46 from an air source 48 (e.g., an inlet which receives filtered, heated and pressurized air). The Venturi meter device 42 causes a change in air pressure ($\Delta P$) between different sections. The differential pressure sensor 44 measures this change in air pressure (ΔP) and outputs the pressure signal 38, which reflects the air pressure change (ΔP), to the electronic engine controller 30 for processing.

It should be understood that the components of the mass airflow sensing apparatus 28 are well-suited for the rigors of the piston aircraft engine assembly 20. In particular, the Venturi meter device 42 and the differential pressure sensor 44 are more durable than conventional automotive thin wire pressure sensors which could easily break under the harsh conditions of piston aircraft engine 22 (i.e., severe vibration and stress, greater pressure, etc.).

It should be further understood that the piston aircraft engine assembly 20 is shown in FIG. 1 as having six cylinder assemblies 36 by way of example only, i.e., three on each side of a central engine frame 50. Other numbers of cylinder assemblies 36 are suitable for use as well (e.g., four, eight, etc.) and may be dictated by the type and size of engine load (e.g., a propeller, a helicopter blade, one or more secondary devices such as pumps and alternators/generators, etc.). Further details will now be provided with reference to FIGS. 2 and 3.

Figure 2:
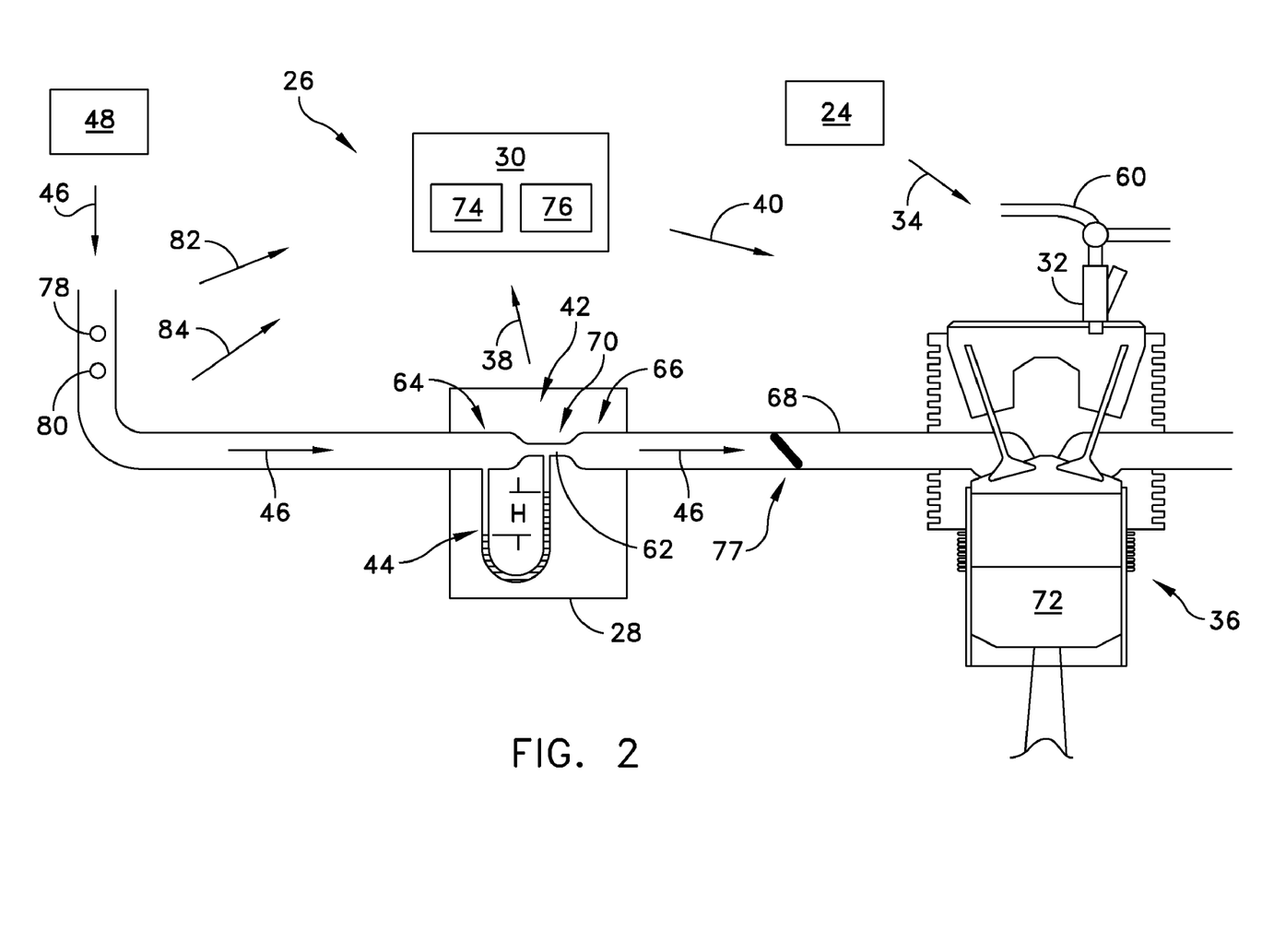
Figure 3:
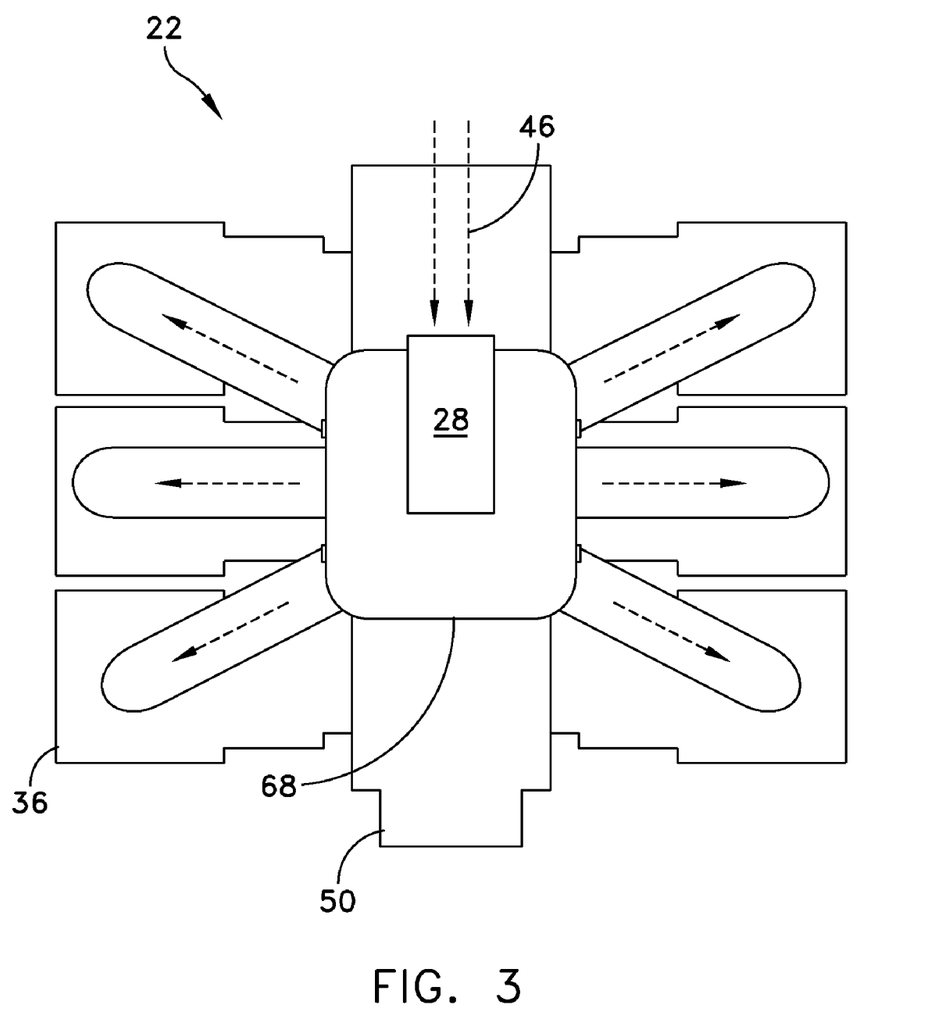

FIGS. 2 and 3 show various components of the piston aircraft engine 22 and the control system 26 which are involved in delivery of fuel 34 and air 46 to a cylinder assembly 36 of the piston aircraft engine 22. FIG. 2 is a diagram of particular sensing components involved in delivering fuel 34 and air 46 to a cylinder assembly 36. FIG. 3 is an illustration of a manifold 68 which distributes air 46 to each cylinder assembly 36.

In general, the electronic engine controller 30 is adapted to carry out a set of operations based on Bernoulli's Principle. These operations, which use input from a variety of sensors, enable the electronic engine controller 30 to reliably and precisely identify the mass of air ($Q_m$) flowing into the piston aircraft engine 22 (FIG. 1). Once the electronic engine controller 30 has determined the mass of airflow, the electronic engine controller 30 carries out further operations (e.g., stoichiometric calculations) to determine the proper amounts of fuel 34 (e.g., based on a particular fuel/air ratio) and provides a fuel injector signal 40 to a fuel injector 32 to deliver an appropriate amount of fuel 34 to a cylinder assembly 36 of the piston aircraft engine 22.

As shown in FIG. 2, a fuel rail 60 carries fuel 34 under pressure from the fuel source 24 to the fuel injector 32 that delivers fuel to the cylinder assembly 36. Such a fuel rail 60 may include multiple ports to facilitate fuel purging and thus minimize the possibility of undesired vaporization following engine operation.

The mass airflow sensing apparatus 28, as mentioned earlier, preferably includes a Venturi meter device 42 which defines a narrow channel or opening 62 to limit the total flow rate through the channel 62. In particular, the Venturi meter device 42 includes an inlet portion 64 adapted to receive air 46 from the air source 48, an outlet portion 66 adapted to output the air 46 to the manifold 68 of the piston aircraft engine 20 which leads to each cylinder assembly 36. The Venturi meter device 42 further includes a constricted portion 70 disposed between the inlet portion 64 and the outlet portion 66. The constricted portion 70 has the narrow channel 62 which causes an air pressure change (ΔP) as the air 46 passes from the inlet portion 64 to the outlet portion 66 through the constricted portion 70.

The differential pressure sensor 44 is preferably a manometer which connects to both the inlet portion 64 and the constricted portion 70 of the Venturi meter device 42. During operation, the differential pressure sensor 44 (i) measures a pressure difference (ΔP), which is illustrated graphically as a change in fluid height (H) in FIG. 2, between the inlet portion 64 and the constricted portion 70, and (ii) outputs, as the pressure signal 38, an electronic signal (e.g., a voltage, a current, a digital number, etc.) representing the pressure difference (ΔP).

Upon receipt of the pressure signal 38 from the differential pressure sensor 44, the electronic engine controller 30 determines the amount of air mass ($Q_m$) flowing through the Venturi meter device 42. The electronic engine controller 30 uses this air mass amount ($Q_m$) with other data to control the fuel/air ratio (i.e., the ratio of fuel 34 and air 46) to each cylinder assembly 36 when carrying out combustion to drive the piston 72 within that cylinder assembly 36.

As shown in FIG. 2, the electronic engine controller 30 includes a signal processor 74, and a control processor or ECU 76 (electronic engine control unit), which receives the various input signals from the sensors and calculates the engine operating parameters based upon the input signals. Based upon the engine operating parameters, the control processor 76 adjusts the various engine operating parameters to optimize the performance of the piston aircraft engine 22, e.g., the fuel/air ratio to each cylinder assembly 36, the position of the throttle 77, etc. While the electronic engine controller 30 can be configured in a variety of ways, in one arrangement, the electronic engine controller 30 is configured as a Full Authority Digital Engine Controller (FADEC).

The following equations illustrate how the electronic engine controller 30 is capable of determining the mass of air ($Q_m$) flowing into the piston aircraft engine 22. Equation (1) is suitable for calculating the air mass ($Q_m$) passing through the Venturi meter device 42.

$$Q_m = \frac{C * A_{throat} * \sqrt{2 * \rho_{air} * \Delta P}}{\sqrt{1 - \beta^4}}, \tag{1}$$

where:
C=the discharge coefficient
$A_{throat}$=the cross-sectional area (e.g., diameter) of the inlet portion 64
$\rho_{air}$=air density
ΔP=the change in air pressure
β=the Venturi ratio.

Equation (2) is suitable for calculating the cross-sectional area of the inlet portion 64.

$$A_{throat} = \frac{\pi}{4} * d^2. \tag{2}$$

where d=the cross-sectional area of the constricted portion 70.

Equation (3) is suitable for calculating the air density ($\rho_{air}$).

$$\rho_{air} = \frac{P_{prethrottle}}{R * T_{manifold}}. \tag{3}$$

where:
$P_{prethrottle}$=Pre-throttle pressure in Pa
$T_{manifold}$=Manifold temperature in Kelvin
R=the ideal gas constant for dry air (287.05 J/Kg·K).

Equation (4) is suitable for calculating the Venturi ratio (β).

$$\beta = \frac{d}{D}. \quad (4)$$

where D=the cross-sectional area of the inlet portion 64.

As shown above, the air mass ($Q_m$) through the Venturi meter device 42 is based on a variety of information including the ratio of the cross-sectional area (d) of the constricted portion of the Venturi meter device to a cross-sectional area (D) of the inlet portion of the Venturi meter device. Additionally, the air mass ($Q_m$) is further based on the pressure difference (ΔP) which is represented by the pressure signal 38 outputted by the differential pressure sensor 44. Furthermore, the air mass ($Q_m$) is further based on the air density ($\rho_{air}$).

To measure the air density ($\rho_{air}$) of the air 46 entering the engine 20, the engine control system 26 further includes a temperature sensor 78 and a pre-throttle pressure sensor 80 (also see FIG. 2). The temperature sensor 78 is disposed between the inlet portion 64 of the Venturi meter device 42 and the air source 48, and provides a temperature signal 82 representing air temperature ($T_{manifold}$). The pre-throttle pressure sensor 80 is similarly disposed between the inlet portion 64 of the Venturi meter device and the air source 48, and provides a pressure signal 84 representing pre-throttle air pressure ($P_{prethrottle}$). As described above, the signal processor 74 of the electronic engine controller 30 receives these signals 82, 84, and the ECU 76 processes the data contained within these signals 82, 84 into the air density result ($\rho_{air}$) for generating the mass airflow result ($Q_m$).

At this point, it should be understood that improvements can be made to the mass airflow result generated by the electronic engine controller 30. In particular, due to the shape and the location of certain pressure measurement points within the Venturi meter device 42, there may be a pressure decrease resulting in an actual pressure that is less than that measured by the differential pressure sensor 44. That is, such inaccuracy may be caused by airflow anomalies such as turbulence and/or the ram-air effect.

In some arrangements, the ECU 76 of the electronic engine controller 30 compensates for such a pressure decrease by applying a correction factor ($C_F$). This correction factor ($C_F$) is generally a function of volume flow and density.

Figure 4:
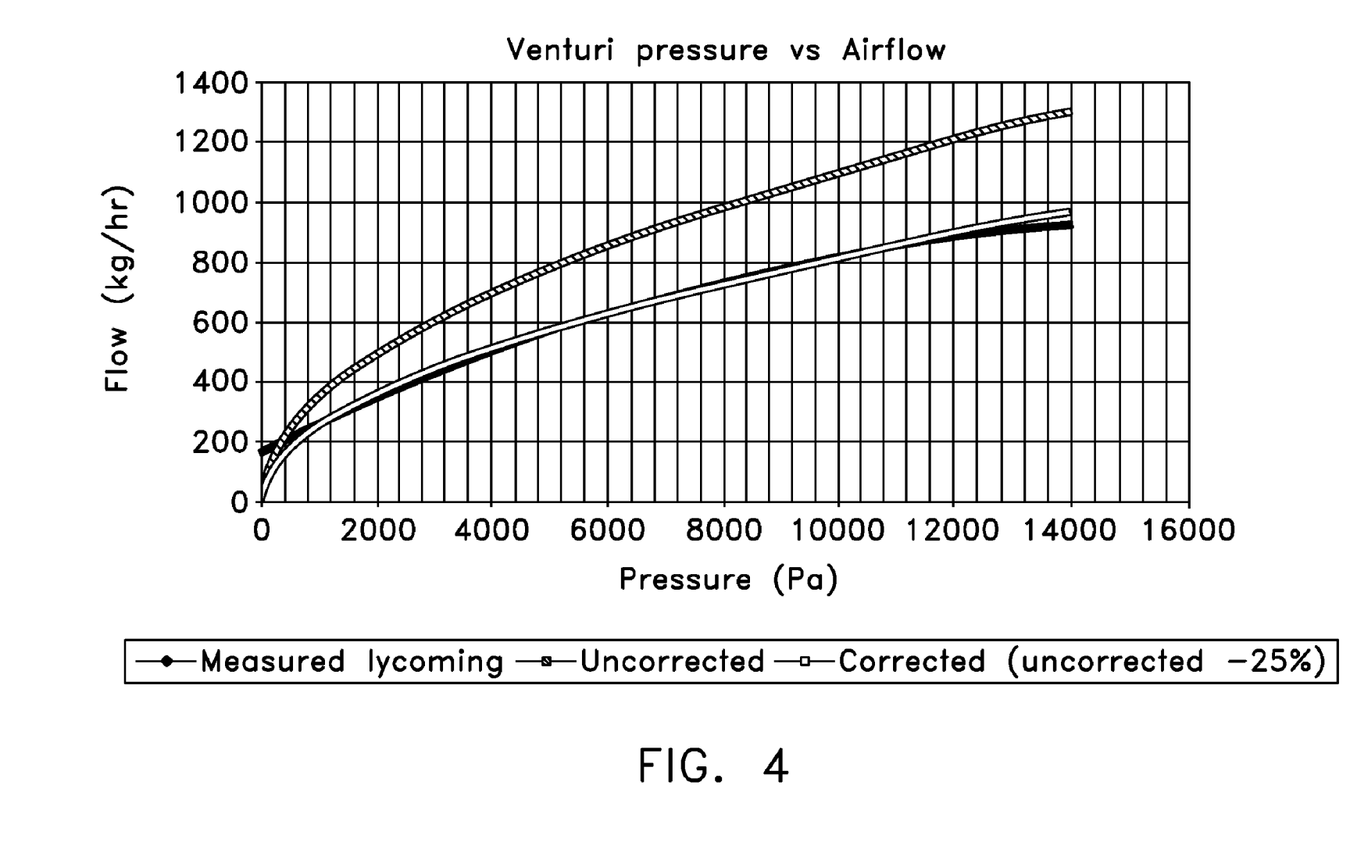

FIG. 4 shows, by way of example only, a situation in which it has been determined that the correction factor ($C_F$) should be 25%. In particular, FIG. 4 shows a chart of the actual pressure (in Pa) through the Venturi meter device 42 vs. air flow (in kg/hr). For other situations in which the actual pressure (in Pa) and the air flow (in kg/hr) proportionately vary by a different amount, the correction factor ($C_F$) may vary as well (e.g., within a range of 10% to 35%).

To apply the correction factor ($C_F$), the ECU 76 initially generates a first mass airflow result ($Q_{m1}$) which approximates the actual air mass flowing through the Venturi meter device 42. The ECU 76 then applies the correction factor ($C_F$) to generate a second mass airflow result ($Q_{m2}$) which more accurately identifies the actual air mass flowing through the Venturi meter device 42. The ECU 76 then uses this adjusted mass airflow result ($Q_{m2}$) when generating the fuel injector signals 40 to the respective fuel injectors 32. Further details will now be provided with reference to FIG. 5.

Figure 5:
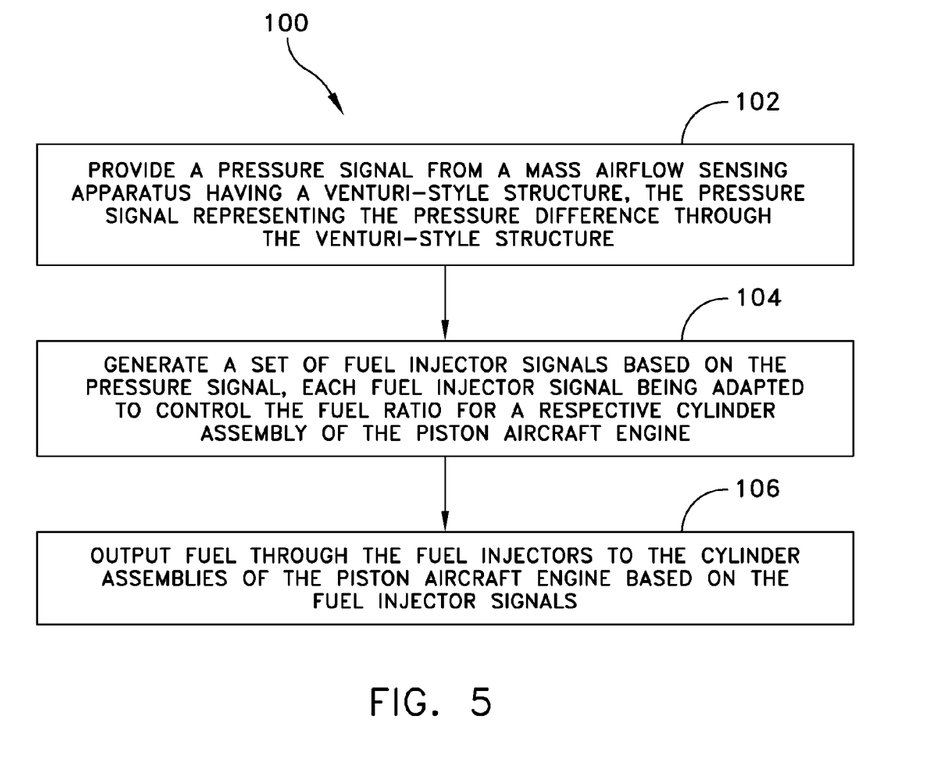

FIG. 5 shows a procedure 100 which is performed by various components of the control system 26 of the piston aircraft engine assembly 20 (also see FIG. 1). In step 102, the mass airflow sensing apparatus 28 provides a pressure signal 38 which the electronic engine controller 30 receives and processes. As mentioned above, the pressure signal 38 represents the pressure difference (ΔP) through the Venturi meter device 42 which enables determination of the mass of air ($Q_m$) flowing into the piston aircraft engine 22.

In step 104, the electronic engine controller 30 generates a set of fuel injector signals 40 based on the pressure signal 38. These fuel injector signals 40 are adapted to individually control the fuel/air ratio for each cylinder assembly 36 of the piston aircraft engine 22.

In step 106, the fuel injectors 32 meter the fuel 34 to the cylinder assemblies 36 in response to the fuel injector signals 40. As a result, combustion which drives the pistons 72 (FIG. 2) is dependably and precisely controlled.

Moreover, as mentioned above in connection with FIG. 4, the electronic engine controller 30 is capable of performing additional operations to more accurately identify the actual mass airflow through the Venturi meter device 42. For example, the electronic engine controller 30 is capable of applying a correction factor ($C_F$) such as a 25% reduction to generate a more accurate measure of the mass airflow.

As described above, an improved technique involves utilization of a Venturi-style mass airflow sensing apparatus 28 to deliver fuel 34 to a piston aircraft engine 22. Such a mass airflow sensing apparatus 28 is capable of dependably providing a pressure signal 38 to an electronic engine controller 30 which controls operation of a set of fuel injectors 32. The electronic engine controller 30 is then able to accurately determine the mass of the airflow ($Q_m$) to the piston aircraft engine 22 and properly generate a set of fuel injector signals 40 for controlling fuel delivery through the set of fuel injectors 32. Accordingly, reliable and precise fuel metering to each cylinder assembly 36 of the piston aircraft engine 22 is obtainable.

While various embodiments of the invention have been particularly shown and described, it will be understood by those skilled in the art that various changes in form and details may be made therein without departing from the spirit and scope of the invention as defined by the appended claims.

For example, it should be understood that the Venturi meter device 42 is shown as a Venturi tube by way of example only. In other arrangements, the Venturi meter device 42 is implemented as a different pressure changing structure such as an orifice plate which operates using principles similar to that of a Venturi tube. Various other pressure sensors which focus on durability and reliability in harsh piston aircraft engine environments are suitable for use as well.

Additionally, it should be understood that the various signals described above are capable of taking a variety of forms. For example, depending on the complexity of the particular electronic devices, each signal may be a voltage, a current, an analog signal, a digital signal, or other signaling form. Such signals preferably enjoy connectivity from the signal source to the signal destination through a respective cable.

Furthermore, it should be understood that the particular design for the manifold 68 was illustrated above as having a hub and spoke topology for six cylinder assemblies 36 (e.g., see FIG. 3) by way of example only. Other designs and topologies are suitable for use as well. Moreover, the manifold 68 is capable of being adapted to complement an exhaust manifold which handles/processes exhaust gases exiting the cylinder assemblies 36. Also, the particular design/topology for the manifold 68 is preferably optimized for the particular number and arrangement of cylinder assemblies 36, and provides advantageous locations for various components such as the mass airflow sensing apparatus 28, an optional intercooler, a turbocharger, a compressor, and so on. Such modifications and enhancements are intended to belong to various embodiments of the invention.

What is claimed is:

1. A piston aircraft engine assembly, comprising:
a piston aircraft engine;
a fuel source; and
a control system adapted to deliver fuel from the fuel source to the piston aircraft engine, the control system including:
a mass airflow sensing apparatus adapted provide a pressure signal,
an electronic engine controller coupled to the mass airflow sensing apparatus, the electronic engine controller being adapted to (i) receive the pressure signal from the mass airflow sensing apparatus and (ii) generate a set of fuel injector signals based on the pressure signal received from the mass airflow sensing apparatus, and
a set of fuel injectors adapted to meter the fuel in response to the set of fuel injector signals generated by the electronic engine controller;
wherein the mass airflow sensing apparatus of the control system includes a Venturi meter device having an inlet portion adapted to receive air from an air source, and an outlet portion adapted to output the air to a manifold of the piston aircraft engine;
wherein the Venturi meter device further includes a constricted portion disposed between the inlet portion and the outlet portion, the constricted portion being adapted to cause a change in pressure as the air passes from the inlet portion to the outlet portion through the constricted portion;
wherein the mass airflow sensing apparatus of the control system further includes a differential pressure sensor adapted to (i) measure a pressure difference between the inlet portion of the Venturi meter device and the constricted portion of the Venturi meter device, and (ii) output, as the pressure signal, an electronic signal to the electronic engine controller, the electronic signal representing the pressure difference;
wherein the electronic engine controller, when generating the set of fuel injector signals based on the pressure signal received from the mass airflow sensing apparatus, is adapted to:
generate a first airflow result approximating an amount of air mass flowing through the Venturi meter device based on the electronic signal outputted by the differential pressure sensor;
generate a second airflow result based on (i) the first airflow result and (ii) a correction factor which compensates for turbulence in the Venturi meter device, the second airflow result more accurately approximating the amount of air mass flowing through the Venturi meter device than the first airflow result; and
output the set of fuel injector signals based on the second airflow result.

2. A piston aircraft engine assembly as in claim 1 wherein the electronic engine controller of the control system, when generating the set of fuel injector signals based on the pressure signal received from the mass airflow sensing apparatus, is adapted to:
generate an airflow result approximating an amount of air mass flowing through the Venturi meter device based on (i) a ratio of a cross-sectional area of the constricted portion of the Venturi meter device to a cross-sectional area of the inlet portion of the Venturi meter device, and (ii) the pressure difference represented by the electronic signal outputted by the differential pressure sensor.

3. A piston aircraft engine assembly as in claim 2 wherein the electronic engine controller of the control system is further adapted to generate an air density result approximating an air density of the air from the air source; and
wherein the electronic engine controller of the control system, when generating the airflow result, is adapted to further base the airflow result on the air density result.

4. A piston aircraft engine assembly as in claim 3 wherein the control system further includes:
a temperature sensor disposed between the inlet portion of the Venturi meter device and the air source, the temperature sensor being adapted to provide a temperature signal representing air temperature; and
wherein the electronic engine controller, when generating the air density result, is adapted to base the air density result on the temperature signal.

5. A piston aircraft engine assembly as in claim 4 wherein the control system further includes:
a pre-throttle sensor disposed between the inlet portion of the Venturi meter device and the air source, the pre-throttle sensor being adapted to provide a pressure signal representing pre-throttle air pressure; and
wherein the electronic engine controller, when generating the air density result, is adapted to further base the air density result on the pressure signal representing the pre-throttle air pressure.

6. A piston aircraft engine control system to deliver fuel to a piston aircraft engine, comprising:
a mass airflow sensing apparatus adapted provide a pressure signal;
an electronic engine controller coupled to the mass airflow sensing apparatus, the electronic engine controller being adapted to (i) receive the pressure signal from the mass airflow sensing apparatus and (ii) generate a set of fuel injector signals based on the pressure signal received from the mass airflow sensing apparatus; and
a set of fuel injectors adapted to provide fuel to the piston aircraft engine in response to the set of fuel injector signals generated by the electronic engine controller;
wherein the mass airflow sensing apparatus includes a Venturi meter device having an inlet portion adapted to receive air from an air source, and an outlet portion adapted to output the air to a manifold of the piston aircraft engine;
wherein the Venturi meter device further includes a constricted portion disposed between the inlet portion and the outlet portion, the constricted portion being adapted to cause a change in pressure as the air passes from the inlet portion to the outlet portion through the constricted portion;
wherein the mass airflow sensing apparatus further includes a differential pressure sensor adapted to (i) measure a pressure difference between the inlet portion of the Venturi meter device and the constricted portion of the Venturi meter device, and (ii) output, as the pressure signal, an electronic signal to the electronic engine controller, the electronic signal representing the pressure difference;
wherein the electronic engine controller, when generating the set of fuel injector signals based on the pressure signal received from the mass airflow sensing apparatus, is adapted to:

generate a first airflow result approximating an amount of air mass flowing through the Venturi meter device based on the electronic signal outputted by the differential pressure sensor;

generate a second airflow result based on (i) the first airflow result and (ii) a correction factor which compensates for turbulence in the Venturi meter device, the second airflow result more accurately approximating the amount of air mass flowing through the Venturi meter device than the first airflow result; and output the set of fuel injector signals based on the second airflow result.

7. A piston aircraft engine control system as in claim 6 wherein the electronic engine controller, when generating the set of fuel injector signals based on the pressure signal received from the mass airflow sensing apparatus, is adapted to:

generate an airflow result approximating an amount of air mass flowing through the Venturi meter device based on (i) a ratio of a cross-sectional area of the constricted portion of the Venturi meter device to a cross-sectional area of the inlet portion of the Venturi meter device, and (ii) the pressure difference represented by the electronic signal outputted by the differential pressure sensor.

8. A piston aircraft engine control system as in claim 7 wherein the electronic engine controller is further adapted to generate an air density result approximating an air density of the air from the air source; and wherein the electronic engine controller, when generating the airflow result, is adapted to further base the airflow result on the air density result.

9. A piston aircraft engine control system as in claim 8, further comprising:

a temperature sensor disposed between the inlet portion of the Venturi meter device and the air source, the temperature sensor being adapted to provide a temperature signal representing air temperature; and wherein the electronic engine controller, when generating the air density result, is adapted to base the air density result on the temperature signal.

10. A piston aircraft engine control system as in claim 9, further comprising:

a pre-throttle sensor disposed between the inlet portion of the Venturi meter device and the air source, the pre-throttle sensor being adapted to provide a pressure signal representing pre-throttle air pressure; and wherein the electronic engine controller, when generating the air density result, is adapted to further base the air density result on the pressure signal representing the pre-throttle air pressure.

11. A piston aircraft engine control system as in claim 6 wherein the second airflow result is equal to the first airflow result reduced by the correction factor; and wherein the correction factor is substantially 25%.

12. A method of delivering fuel to a piston aircraft engine, the method comprising:

providing, to an electronic engine controller, a pressure signal from a mass airflow sensing apparatus which includes (i) a Venturi meter device having an inlet portion adapted to receive air from an air source, an outlet portion adapted to output the air to a manifold of the piston aircraft engine, and a constricted portion disposed between the inlet portion and the outlet portion, the constricted portion being adapted to cause a change in pressure as the air passes from the inlet portion to the outlet portion through the constricted portion, and (ii) a differential pressure sensor adapted to measure a pressure difference between the inlet portion of the Venturi meter device and the constricted portion of the Venturi meter device, and output the pressure signal which represents the pressure difference;

generating, from the electronic engine controller, a set of fuel injector signals based on the pressure signal; and providing fuel to the piston aircraft engine through a set of fuel injectors in response to the set of fuel injector signals;

wherein generating the set of fuel injector signals includes:

generating a first airflow result approximating an amount of air mass flowing through the Venturi meter device based on the pressure signal which represents the pressure difference between the inlet portion of the Venturi meter device and the constricted portion of the Venturi meter device, generating a second airflow result based on (i) the first airflow result and (ii) a correction factor which compensates for turbulence in the Venturi meter device, the second airflow result more accurately approximating the amount of air mass flowing through the Venturi meter device than the first airflow result, and outputting the set of fuel injector signals based on the second airflow result; and wherein the second airflow result is equal to the first airflow result reduced by the correction factor; and wherein the correction factor is substantially 25%.

13. A piston aircraft engine assembly as in claim 1 wherein the first airflow result identifies a first air mass amount;

wherein the electronic engine controller, when generating the second airflow result based on (i) the first airflow result and (ii) the correction factor which compensates for turbulence in the Venturi meter device, is constructed and arranged to:

decrease the first air mass amount by a predefined fixed percentage to provide a second air mass amount which is identified by the second airflow result.

14. A piston aircraft engine assembly as in claim 13 wherein the first air mass amount is an initial approximation of the amount of air flowing through the Venturi meter device;

wherein the second air mass amount is a more accurate approximation of the amount of air flowing through the Venturi meter device; and wherein the second air mass amount is lower than the first air mass amount by the predefined fixed percentage due to application of the correction factor, the predefined fixed percentage being within a range of 10% to 35%.

15. A piston aircraft engine assembly as in claim 13 wherein the air source is an aircraft engine inlet which is constructed and arranged to receive air which has been filtered, heated, and pressurized for piston aircraft engine operation at an altitude substantially above ground level.

16. A piston aircraft engine assembly as in claim 13:

wherein the differential pressure sensor is a manometer having a manometer fluid exposed at a first end of the manometer to the inlet portion of the Venturi meter device and at a second end of the manometer to the constricted portion of the Venturi meter device;

wherein being adapted to measure the pressure difference between the inlet portion of the Venturi meter device and the constricted portion of the Venturi meter device includes being adapted to measure a difference in height between the manometer fluid at the first end of the manometer and the second end of the manometer.

17. A piston aircraft engine control system as in claim 6 wherein the first airflow result identifies a first air mass amount;

wherein the electronic engine controller, when generating the second airflow result based on (i) the first airflow result and (ii) the correction factor which compensates for turbulence in the Venturi meter device, is constructed and arranged to:

decrease the first air mass amount by a predefined fixed percentage to provide a second air mass amount which is identified by the second airflow result.

18. A piston aircraft engine assembly as in claim 17 wherein the first air mass amount is an initial approximation of the amount of air flowing through the Venturi meter device;

wherein the second air mass amount is a more accurate approximation of the amount of air flowing through the Venturi meter device; and wherein the second air mass amount is lower than the first air mass amount by the predefined fixed percentage due to application of the correction factor, the predefined fixed percentage being within a range of 10% to 35%.

19. A method as in claim 12 wherein the first airflow result identifies a first air mass amount;

wherein generating the second airflow result based on (i) the first airflow result and (ii) the correction factor which compensates for turbulence in the Venturi meter device includes decreasing the first air mass amount by a predefined fixed percentage to provide a second air mass amount which is identified by the second airflow result.

20. A method as in claim 19 wherein the first air mass amount is an initial approximation of the amount of air flowing through the Venturi meter device;

wherein the second air mass amount is a more accurate approximation of the amount of air flowing through the Venturi meter device; and wherein the second air mass amount is lower than the first air mass amount by the predefined fixed percentage due to application of the correction factor, the predefined fixed percentage being within a range of 10% to 35%.

* * * * *